United States Patent [19]

Martinez-Vera

[11] Patent Number: 4,821,394
[45] Date of Patent: Apr. 18, 1989

[54] METHOD AND APPARATUS FOR CONVERSION OF A STANDARD AUTOMOBILE TOP TO A DETACHED ROOF AND/OR T-TOP MODEL

[76] Inventor: Ruben Martinez-Vera, 1819 Babcock Rd. #107, San Antonio, Tex. 78229

[21] Appl. No.: 542,178

[22] Filed: Oct. 14, 1983

[51] Int. Cl.⁴ .................................................. B60J 7/11
[52] U.S. Cl. ..................................... 29/401.1; 296/218
[58] Field of Search ......................... 29/401.1; 296/218

[56] References Cited

U.S. PATENT DOCUMENTS

| | | | |
|---|---|---|---|
| 4,238,876 | 12/1980 | Monroe et al. | 29/401.1 |
| 4,330,150 | 5/1982 | Dunchock et al. | 296/218 |
| 4,457,555 | 7/1984 | Draper | 29/401.1 |

FOREIGN PATENT DOCUMENTS

| | | | |
|---|---|---|---|
| 149213 | 11/1981 | Japan | 296/218 |
| 2086316 | 5/1982 | United Kingdom | 296/218 |

OTHER PUBLICATIONS

Corvette Parts Catalog (1953-1973), 1968-73 Corvette Roof Panel, Chevrolet Motor Div., Detroit, Mich. 48202 ©1972, pp. 12-19P.

Chevrolet Motor Division, Product Description Manual, 1979 Chev. "Y".

*Primary Examiner*—Joseph M. Gorski
*Attorney, Agent, or Firm*—Gunn, Lee & Jackson

[57] ABSTRACT

An apparatus and method for modifying the roof of an automobile so as to enable the automobile to be easily converted from a detached roof style to a T-top style is disclosed. The method involves the preparation and removal of a portion of the existing vehicular roof. After reinforcement of the wind shield header and rear roof portion, the header and rear roof portion are adapted to accept an apparatus for bridging the header and the rear roof portion to permit the removable attachment of roof panels. The apparatus comprises a spanning member having a first end adapted to be removably secured to the modified header and a second end adapted to be removably secured to the modified rear roof portion. The apparatus further has sealing means on the ends of the spanning member which align with sealing means on the modified header and rear roof portion. A flange member is connected to the spanning member and is adapted to permit the removable attachment of the roof panels when the spanning member is secured to the header and rear roof portion.

6 Claims, 4 Drawing Sheets

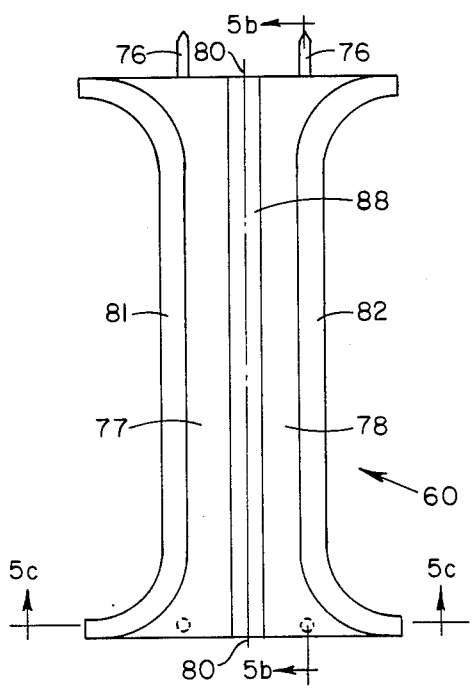
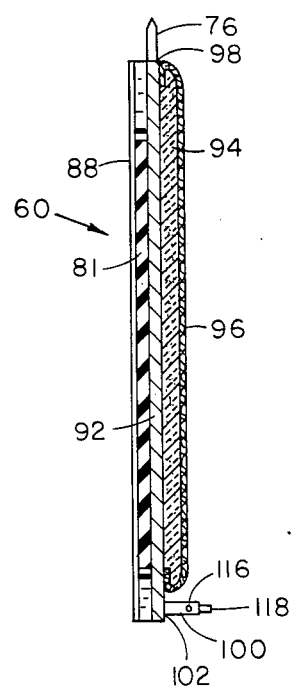
FIG. 5a    FIG. 5b
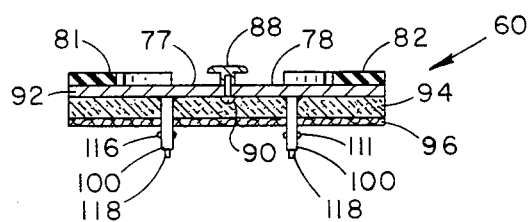
FIG. 5c
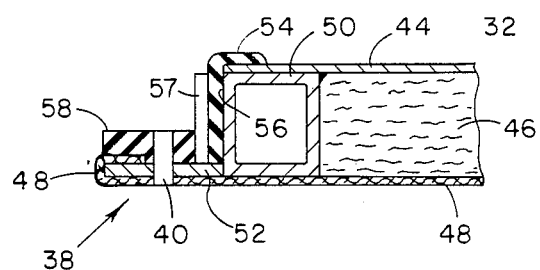
FIG. 3

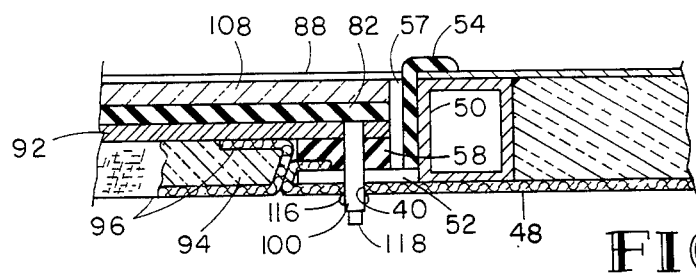
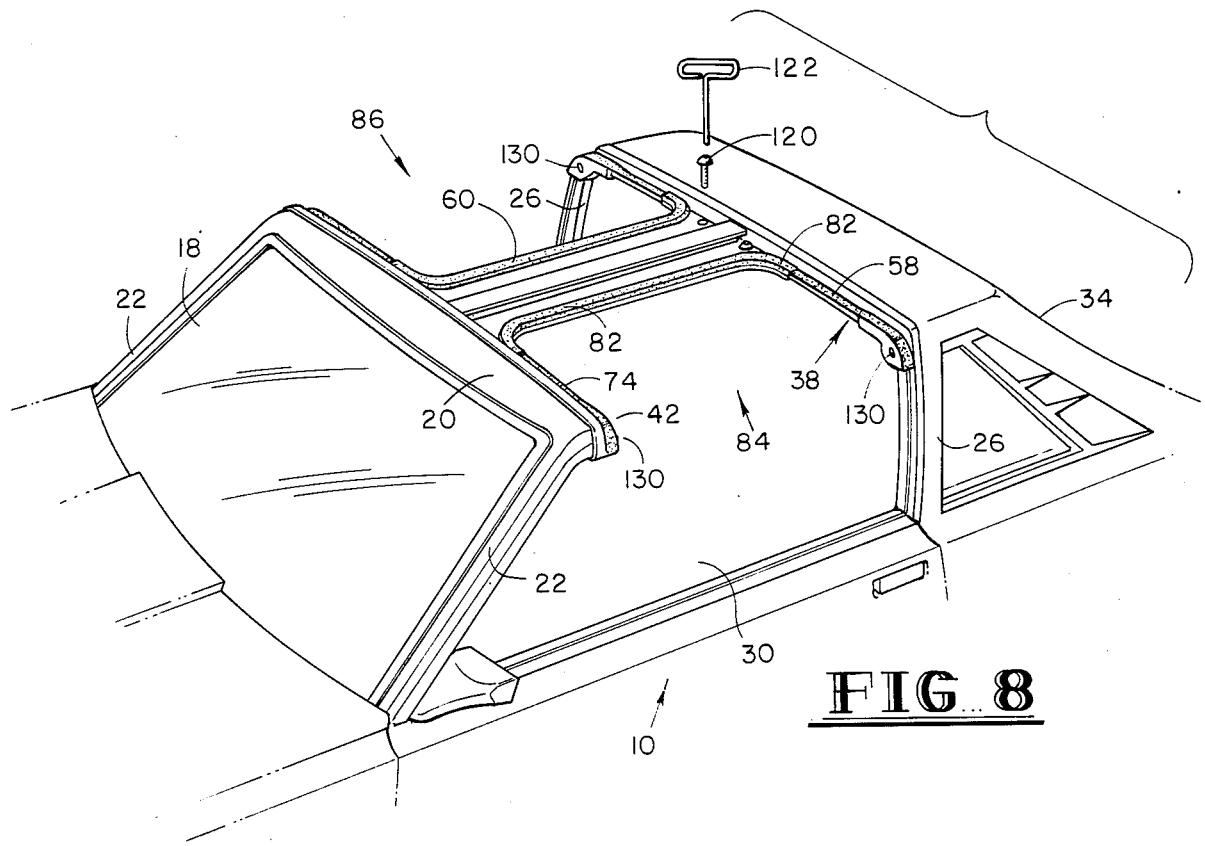

METHOD AND APPARATUS FOR CONVERSION OF A STANDARD AUTOMOBILE TOP TO A DETACHED ROOF AND/OR T-TOP MODEL

BACKGROUND OF THE INVENTION

This invention related to a removable spanning member for the roof of vehicles and the method of installing such bar in the roof portion of conventional automobiles. The present invention further relates to providing a passenger car with both the capabilities of having a detached roof arrangement and alternatively a T-top or hatch top arrangement.

DESCRIPTION OF THE PRIOR ART

In the past conventional vehicles have not been easily modifiable to become what is known as T-top or hatch top type vehicles. The primary difficulty in converting the roof of the conventional vehicle to a T-top centered on the cutting away of openings in the roof, leaving a portion of the original body disposed longitudinally to the body. The cutting required careful positioning of templets, followed by complex installations to and finishing of the perimeter of the roof openings. Simply cutting away sections of the roof without providing additional structural support weakened the vehicle body and changed the characteristics of the body to withstand certain loads imposed during the operation of the vehicle.

U.S. Pat. Nos. 4,120,529 and 4,138,155 provide a partial solution to the aforementioned problems. However, the afore-mentioned patents disclosed a relatively complex roof panel arrangement which merely yielded a permanent T-top or hatch top roof. No capabilities were provided to enable one to convert to a totally detached roof model.

No prior art is known to the inventor which teaches or discloses a method or apparatus which enables one to convert a conventional automobile roof to a roof capable of being both a T-top type and a totally detached roof type as disclosed in the present invention. Nor is there any prior art teaching how to convert an original manufactured hatch top model to a detached roof model.

SUMMARY OF THE INVENTION

It is the aim of the invention to provide both a method and apparatus which allows the same automobile to function as either a T-top model or a totally detached roof model. Because of the of the removability of the apparatus of the invention, a modified automobile becomes two different models in a single unit, thus affording greater versatility.

The conventional convertible top automobile, as well as many detachable roof models, experience certain security difficulties. These types of vehicles are easy prey for car thieves. The hatch top or T-top models are less susceptible to break-ins. Thus, it is another object of this invention to provide additional security means to detachable roof model automobiles.

It is still yet another object of this invention to provide a rapid means of converting from a detachable roof model to a T-top model, and vice versa, without the need for employing complicated installation methods and/or tools.

BRIEF DESCRIPTION OF THE DRAWINGS

FIG. 3 is a cross-sectional view at an enlarged scale taken generally on line 3—3 in view FIG. 2.

FIG. 5a is a top view of the conversion bar of the invention.

FIG. 5b is a cross-sectional view taken along lines 5b—5b in FIG. 5a.

FIG. 5c is a cross-sectional view taken generally on lines 5c—5c in FIG. 5a.

FIG. 7 is a cross-sectional view taken generally along line 7—7 in FIG. 6.

FIG. 8 shows a partially-exploded, perspective view of an alternate embodiment of the invention utilizing simple tooling.

DETAILED DESCRIPTION OF THE PREFERRED EMBODIMENT AND METHOD

Figure 1:
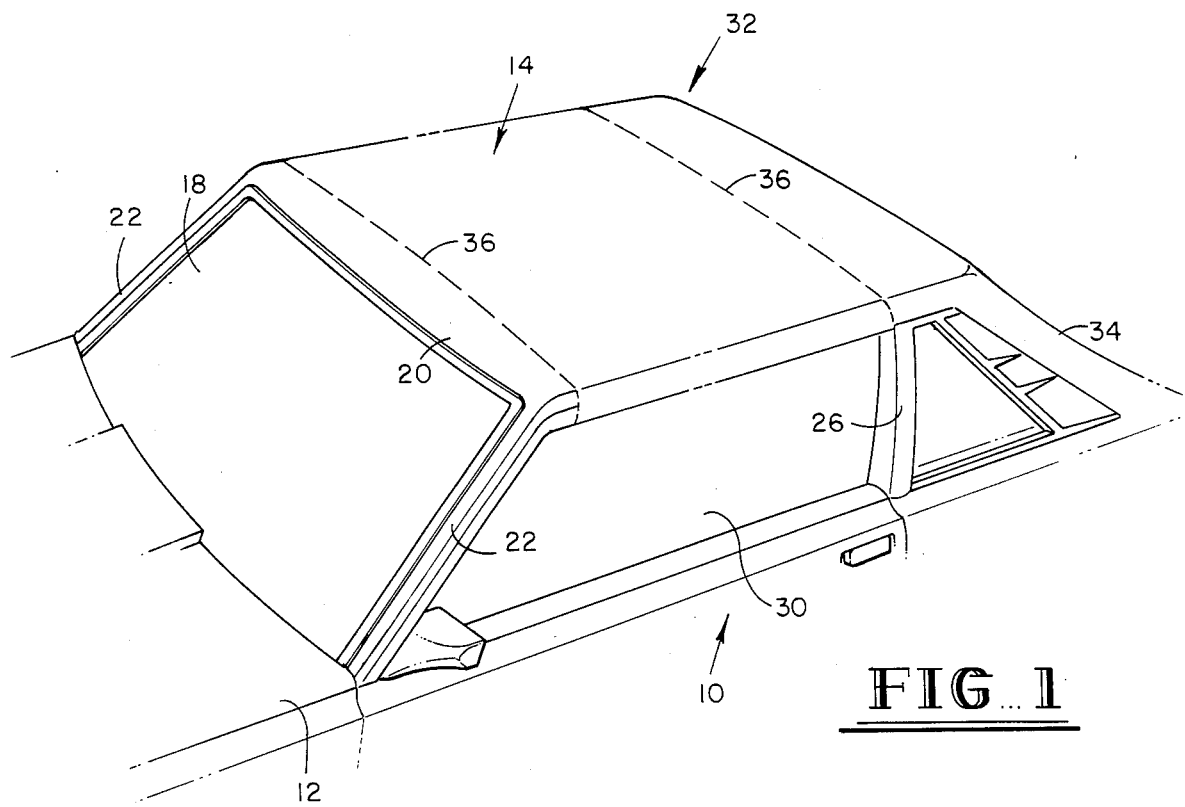
FIG. 1 is a perspective view of the roof portion of a conventional vehicle body indicating lines along which the roof section may be cut.

For a detailed description of the preferred embodiment and method, reference is made to the attached several views wherein identical reference characters will be utilized to refer to identical or equivalent components throughout the various views of the following description.

Referring now to FIG. 1, a conventional or standard automotive vehicle 10 included a fixed super structure or body 12 and a roof portion 14. The roof portion 14 further includes a forward wind shield header 20 supported by a pair of pillars 22 at opposite sides of the wind shield 18 and at the forward leading edge of side window openings 24. The rearward edge of window openings 24 are formed by another pair of vertically extending pillars 26 connected to opposite sides of the vehicular super structure 12. An upper roof portion 20 spans the passenger compartment 30. The rear roof portion 32 is also supported by another pair of pillars 34 extending from the vehicular body 12 to the rear roof section 32.

Depending upon the make of automobile, there may be minor differences in the construction, but basically numerous vertical or nearly vertical pillars support the roof portion 14 as it covers the passenger compartment 30.

To practice the method of the present invention, there is a transverse cutting out of a section of upper roof portion 28. Dotted lines 36 illustrate where such cuts may be made. The vehicle roof 14 is prepared for such cutting by removing some parts which are standard on most conventional vehicles including interior molding, sun visors, liners, dome lights, and the like. Once the roof 14 is prepared, metal cutting shears or a saw may be utilized to cut the outer sheet metal cover of the upper roof portion 28 along transverse lines 36 which are generally symmetrical to the longitudinal center line of the vehicle. The cutting occurs between pillars 22 and 26, adjacent to the rearward portion of the wind shield header 20 and in front of rearward roof portion 32.

After removal of the cut out section of upper roof portion 28, the wind shield header 20 and rear roof portion 32 must be further adapted and structurally strengthened as hereafter described.

Figure 2:
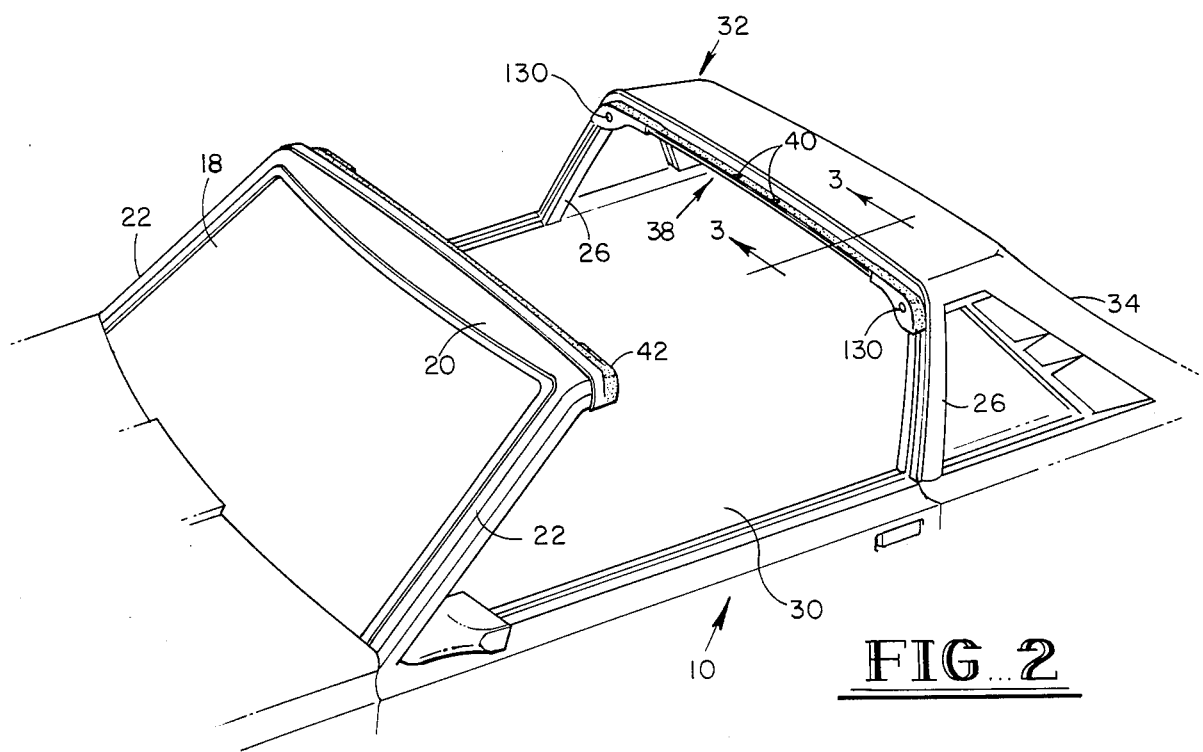
FIG. 2 is a perspective view of the vehicle body showing the roof section removed and modification to the opening.

FIG. 2 illustrates a conventional automobile's roof top modified and appearing as an automobile with a totally detachable roof removed. It is anticipated that eventually automobiles will be originally manufactured with the modified wind shield header and modified rear roof portion discussed below.

As can be seen in FIG. 2, rear roof portion 32 has been modified to include a ledge or flange 38 extending transversely along the leading edge of rear roof portion 32 between pillars 25. Flange 38 includes apertures 40 which extend entirely through flange 38.

In adapting rear roof portion 32 to carry flange 38, additional structural support is attached to rear roof portion 32. Essentially, during the modification, or if originally manufactured as such, rear roof portion 32 becomes supported by a roll yoke or support arch formed which spans the passenger compartment. Pillars 26 are provided with additional structural steel (not shown in the Figures), thus reinforcing pillars 26 down through the frame of the vehicular body 12.

Wind shield header 20 is similarly reinforced both transversely and through pillars 22 at opposite sides of wind shield 18. Such reinforcement is connected to and carried through to the frame of the vehicular bocy 12.

As with rear roof portion 32, wind shield header 20 is adapted to have a transversely extending flange or ledge 42. Depending upon the particular embodiment, ledge 42 may have two bored apertures longitudinally opposite apertures 40 of flange 38 or may have the apertures bored into girder 66 (shown in FIG. 4), as will be discussed below.

FIG. 3 is a cross-sectional view of the details of the reinforcing of rear roof portion 32. Rear roof portion 32 consists primarily of roof sheet metal 44, insulation material 46, and head liner material 48. After the section of upper roof portion 28 (FIG. 1) has been cut out, a box-shaped girder 50 is inserted and connected transversely between pillars 26. Girder 50 is further sandwiched between roof sheet metal 44 and the head liner 48. Thus, a "roll yoke" is formed at the rear roof portion 32 of the modified vehicle. The "roll yoke" consists of the interconnection of girder 50 to the vertical pillars 26 on opposite sides of the vehicle with the pillars 26 having been reinforced previously down through and connected to the vehicular body frame.

Flange 38 is formed along the rear roof portion 32 by connecting lip member 52 along the entire front length of girder 50. In the preferred embodiment, lip member 52 is made of metal and connected, by welding a seam, joining lip member 52 to girder 50. Once flance 38 has been formed, molding member 54 is wrapped around and connected to shoulder 56 along the entire transverse length of girder 50 to provide a clean finished appearance. Weather stripping 57 is connected to molding member 54 to provide a weather-tight fit when the removable roof members are installed.

Flange 38 is further provided with resilient sealing member 58 which also extends the entire length of flange 38. To provide a finished look on the interior of the vehicle, head liner 48 is extended to cover and wrap around lip member 52 as shown in FIG. 3. In the preferred embodiment, apertures 40 are bored through resilient sealing member 58, lip member 52, and head liner 48. Apertures 40 are provided for removable attachment of the conversion bar 60 discussed hereinafter. Alternatively, aperture 40 may be bored horizontally through weather stripping 57, molding member 54, and into box girder 56. This alternative will be discussed in more detail below.

Figure 4:
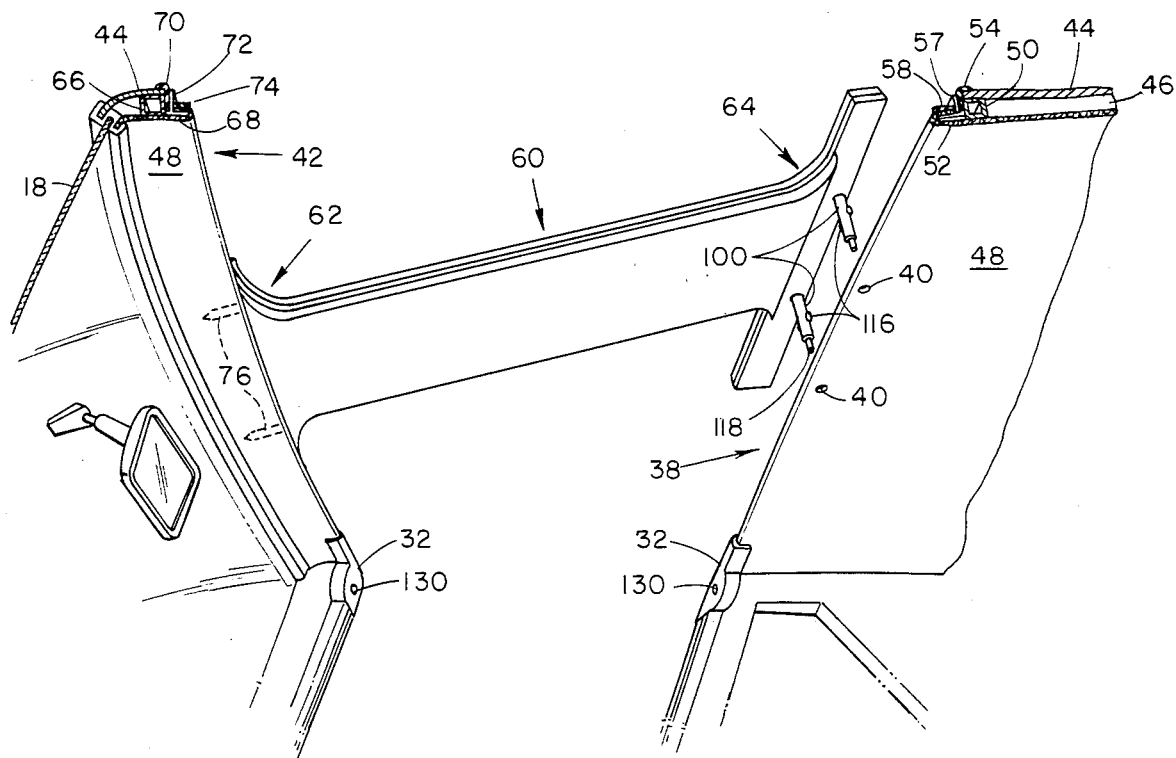
FIG. 4 is a perspective view from the interior of the vehicle showing the underside of the roof with the conversion bar of the invention inserted in the front windshield header and being inserted in the rearward portion of the roof.

FIG. 4 provides an illustration of the installation of a conversion bar 60 of the present invention as viewed from the interior of the modified vehicle. In FIG. 4 the forward end 62 of the conversion bar has been inserted into the reinforced wind shield header 20 and rearward end 64 is being lowered into place into the reinforced rear roof portion 32. The specific details of the construction of conversion bar 60 will be discussed hereinafter.

FIG. 4 also discloses some of the details of the modification and reinforcement of wind shield header 20. Box girder 66 extends transversely across the vehicle roof and connects with posts 22 on opposite sides of the vehicle; it is sandwiched between roof sheet metal 44 and head liner 48. Girder 66 is connected to the reinforced portion of post 22 which extends down through into the vehicular body frame. Wind shield header 20 is also modified to have a lip member 68 connected across the entire length of girder 66. As with the rear roof portion 32 modifications discussed above, wind shield header 20 is finished out with molding member 70, weather strip member 72, resilient sealing member 74, and head liner 48.

In the embodiment shown in FIG. 4, prongs 76 detachably engage conversion bar 60 with the modified wind shield header 20 by passing through apertures (not shown in figures) bored through weather strip 72, molding 70, and eventually into girder 66. These apertures are bored generally symmetrical to the center line of the longitudinal axis of the roof of the vehicle, and opposite apertures 40 in the modified rear roof portion 32. Prongs 76 not only detachably secure the forward end 62 of bar 60 into header 20, but also serve as means for quickly aligning or locating bar 60 longitudinally making the securing and locating of rearward end 64 faster and more accurate. As previously stated, it is envisioned that apertures 40 could be bored norizontally into rear roof portion 32 and the apertures in header 40 bored vertically into ledge 42. In such an embodiment, bar 60 would be inserted in the opposite direction to that stated above.

The details relating to the construction of the conversion bar of the invention are shown in FIGS. 5a, 5b, and 5c. FIG. 5a shows a top view of the conversion bar which when installed serves as a spanning member to bridge or join rear roof portion 32, as modified, to wind shield header 20, as modified.

FIG. 5a shows that conversion bar 60 has sills 77 and 78 on either side of a longitudinal line 80 passing through the center of bar 60. Sills 77 and 78 are adapted to have resilient sealing members 81 and 82 fastened along the outer edge of sills 77 and 78, respectively. When conversion bar 60 is in place in the vehicle, seals 81 and 82 align with seals 58 and 74 on modified rear roof portion 32 and modified wind shield 20, respectively. Thus, essentially, continuous seals are formed around roof openings 84 and 86 (see FIG. 8).

A T-flange 88 is attached to the center of conversion bar 60 and effectively divides conversion bar 60 into a left side and a right side. FIG. 5c illustrates the use of conventional fasteners 90 to affix T-flange 88 to bar 60.

FIG. 5b is a side view of bar 60 detailing its construction A core plate 92 has attached to a portion of its underneath surface insulation material 94 covered by a portion of head liner 96. The underneath side during installation of bar 60 in the vehicle faces the interior passenger compartment of the vehicle.

On the top side of the core plate 92 are affixed the resilient sealing members 81 and 82. FIG. 5b also shows that prongs 76 are inserted in one end of core plate 92 in bore 98. Prongs 76 are maintained in bore 98 either by use of cement, interference fix, or may even be threaded into bore 98.

On the opposite end of core plate 92 are pegs 100 which are inserted into bore 102 in core plate 92. As with prongs 76, pegs 100 may be secured in bore 102 by cement, interference fix, threading, or other conventional methods. Pegs 100 serve as the locking device for detachably securing bar 60 to the vehicle. The locking operation is achieved by the utilization of a ball-spring locking device incorporated within peg 100. Ball member 116 is locked and/or unlocked depending upon whether plunger 118 is depressed. Again, prongs 76 serve to detachably secure the other end of the bar 60 and locate it longitudinally between header 20 and rear roof portion 32.

FIG. 5c is a cross-sectional end view of bar 60 showing the relative orientation of the various components for the bar.

Figure 6:
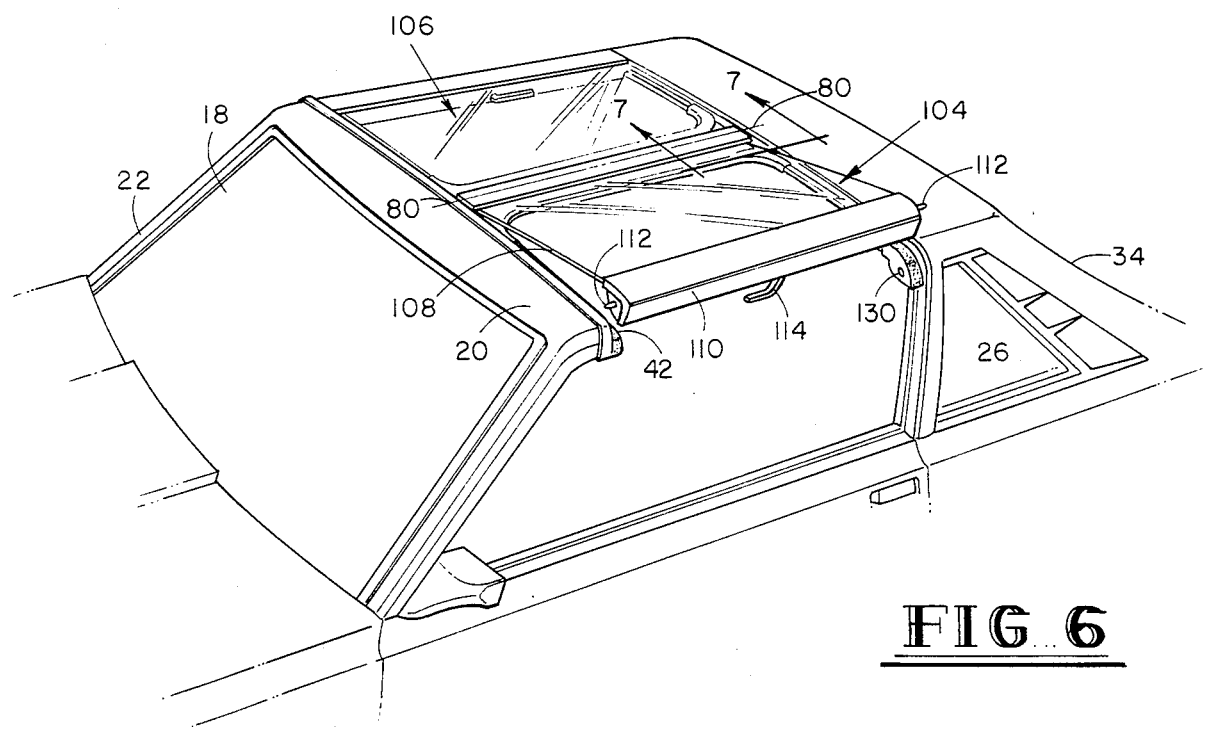
FIG. 6 is a perspective view of the vehicle with the T-top conversion, bar in place and the window panels being inserted.

A modified vehicle with conversion bar 60 installed is illustrated in FIG. 6. Additionally, FIG. 6 shows how roof panels 104 and 106 are detachably engaged beneath the top portion of T-flange 88 and sills 77 and 78.

The typical construction of detachable roof panel 104 includes a roof panel member 108, side panel 100, locking pins 112, and locking handle 114. When roof panel member 108 is slid beneath the top lip of T-flange 88 and on top of sill 78, it is then lowered into a position such that side panel 110 can be detachable engaged to modified wind shield header 10 and modified rear roof portion 32 by means of engagement of pins 112 into engagement apertures 120, which are in the modified header 10 and rear roof portion 32.

A cross-sectional view along lines 7—7 in FIG. 6 is shown in FIG. 7. Here it can be seen how peg 100 of bar 60 passes through bore 40 in resilient seal 58, lip 52, and head liner 48. Thus, bar 60 is detachably secured to ledge 38 because of the ball-spring mechanism in peg 100. The front end of bar 60, it will be recalled, is detachably secured to and located along modified wind shield header 20 by prongs 76.

The ball locking mechanism 116 in peg 100 is known to those in the art, and is released by depressing plunger 118 in peg 100, thereby releasing the spring tension on the balls allowing them to move into appropriate openings within plunger 118, and further enabling bar 60 to be lifted and removed from the vehicle.

As can be seen in FIG. 7, roof panel member 108 is secure between the top part of T-flange 88 and resilient seal 82, which is on sill 78, thereby forming a weather-tight fit. Weather stripping 57 eliminates the possibility of leakage around roof panel member 108, bar 60, and into the interior of the vehicle.

An alternate embodiment for detachably securing bar 60 to the modified vehicle is shown in FIG. 8. Here rather than having prongs 76 engage modified wind shield header 20 and pegs 100 passing through apertures 40 in rear roof portion 32, bar 60 is bored completely through at locations which correspond to bores 40 in rear roof portion 32 and wind shield header 20. Thus, prongs 76 and pegs 100 are eliminated. Conventional removable fasteners 120 are used to detachably secure bar 60 in its proper location spanning wind shield header 20 and rear roof portion 32 using conventional tooling 122. The fasteners are sized such that they do not extend all the way into the interior of the vehicle, and head liner 48 need not be bored through.

It is anticipated that automobile manufacturing operations could be modified to incorporate steps to provide "original" automobiles with the modified wind shield headers 20 and modified rear roof portions 32. These would then accept the conversion bar 60 of the instant application.

Further, originally manufactured T-top or hatch top automobiles may be adapted to accept conversion bar 60, by cutting out the original spanning member, and modifying the front wind shield header and rear roof portions as previously described. Since seals would already exist around the roof openings of originally manufactured T-top autos, seals 81 and 82 along the outer edge of sills 77 and 78 would need to be aligned with the original seals so as to form essentially continuous seals. The process of retrofitting an originally manufactured T-top auto to accept the conversion bar 60 of this invention is further simplified by there only being the need to structurally reinforce the wind shield header and rear roof portion with girders 66 and 50, respectively, at the locations where the original spanning member was cut out.

The foregoing is considered as illustrative only of the principles of the invention. Further, numerous modifications and changes will readily occur to those skilled in the art. It is not desired to limit the invention to the exact construction or operation shown and described, and accordingly all suitable modifications and equivalents may be resorted to, falling within the scope of the invention.

I claim:

1. Apparatus for readily converting a detached roof style vehicle to a T-top style vehicle, comprising:
    an H-shaped spanning member having a first end having detachable fasteners for readily removably securing said first end to a modified front windshield header on said detached roof style vehicle for mating engagement therewith and a second end having detachable fasteners for readily removably securing said second end to a modified rear roof portion on said detached roof style vehicle for mating engagement therewith, said spanning member extending longitudinally from said front windshield header to said rear roof portion at generally the center line of said detached roof style vehicle, said spanning member further comprising sealing means on said first end of said spanning member adapted to align with sealing means on said modified front windshield header and sealing means on said second end of said spanning member adapted to align with sealing means on said modified rear roof portion; and
    a flange member connected to the center portion of said spanning member between said first end and said second end to permit removable attachment of two separate roof panels to said detached roof style vehicle when said first end of said spanning member is secured to said modified front windshield header and said second end of said spanning member is secured to said modified rear roof portion, thereby converting said detached roof style vehicle to said T-top style vehicle.

2. The apparatus of claim 1 wherein said detachable fasteners on said first end are two rigid prongs extending generally perpendicularly and horizontally from a front face of a front leg of said H-shaped member for said mating engagement with two apertures bored in a rear face of said modified windshield header and through said sealing means on said front windshield header, said apertures bored generally symmetrical to said center line of said longitudinal axis of said roof of said vehicle, said detachable fasteners on said second end are two rigid connectors extending generally perpendicularly and vertically from a bottom face of a rear leg of said H-shaped member for said mating engagement with two apertures bored in a top face of said rear roof portion and through said sealing means on said rear roof portion, said apertures bored generally symmetrical to said center line of said longitudinal axis of said roof of said vehicle.

3. The apparatus of claim 1 wherein said detachable fasteners on said first end are two rigid prongs extending generally perpendicularly and vertically from a bottom face of a front leg of said H-shaped member for said mating engagement with two apertures bored in a top face of said modified windshield header and through said sealing means on said front windshield header, said apertures bored generally symmetrical to said center line of said longitudinal axis of said roof of said vehicle, said detachable fasteners on said second end are two rigid connectors extending generally perpendicularly and horizontally from a rear face of a rear leg of said H-shaped member for said mating engagement with two apertures bored in a front face of said rear roof portion and through said sealing means on said rear roof portion, said apertures bored generally symmetrical to said center line of said longitudinal axis of said roof of said vehicle.

4. The method of claim 2 wherein said detachable fasteners on said first end of said H-shaped spanning member are two rigid prongs extending generally perpendicularly and horizontally from a front face of a front leg of said H-shaped member for said mating engagement with two apertures bores in a rear face of said modified windshield header and through said sealing means on said front windshield header, said apertures bored generally symmetrical to said center line of said longitudinal axis of said roof of said vehicle, said detachable fasteners on said second end are two rigid connectors extending generally perpendicularly and vertically from a bottom face of a rear leg of said H-shaped member for said mating engagement with two apertures bored in a top face of said rear roof portion and through said sealing means on said rear roof portion, said apertures bored generally symmetrical to said center line of said longitudinal axis of said roof said vehicle.

5. The method of claim 2 wherein said detachable fasteners on said first end of said H-shaped spanning member are two rigid prongs extending generally perpendicularly and vertically from a bottom face of a front leg of said H-shaped member for said mating engagement with two apertures bored in a top face of said modified windshield header and through said sealing means on said front windshield header, said apertures bored generally symmetrical to said center line of said longitudinal axis of said roof of said vehicle, said detachable fasteners on said second end are two rigid connectors extending generally perpendicularly and horizontally from a rear face of a rear leg of said H-shaped member for said mating engagement with two apertures bored in a front face of said rear roof portion and through said sealing means on said rear roof portion, said apertures bored generally symmetrical to said center line of said longitudinal axis of said roof of said vehicle.

6. A method of modifying the roof portion of an automotive vehicular body to permit the conversion of said body from a detached roof style vehicle to a T-top style vehicle, comprising the steps of:
  (a) preparing and removing a portion of said roof between the windshield header and the rear roof portion of said roof;
  (b) reinforcing said windshield header and said rear roof portion;
  (c) adapting said header and said rear roof portion to accept an apparatus for bridging said header to said rear roof portion to permit removable attachment of said roof panels to said automotive vehicular body, said apparatus comprising:
    an H-shaped spanning member having a first end having detachable fasteners for readily removably securing said first end to a modified front windshield header on said detached roof style vehicle for mating engagement therewith and a second end having detachable fasteners for readily removably securing said second end to a modified rear roof portion on said detached roof style vehicle for mating engagement therewith, said spanning member extending longitudinally form said front windshield header to said rear roof portion at generally the center line of said detached roof style vehicle, said spanning member further comprising sealing means on said first end of said spanning member adapted to align with sealing means on said modified front windshield header and sealing means on said second end of said spanning member adapted to align with sealing means on said modified rear roof portion; and
    a flange member connected to the center portion of said spanning member between said first end and said second end to permit removable attachment of two separate roof panels to said detached roof style vehicle when said first end of said spanning member is secured to said modified front windshield header and said second end of said spanning member is secured to said modified rear roof portion, thereby converting said detached roof style vehicle to said T-top style vehicle.

* * * * *